US012129150B2

(12) United States Patent
Zhang et al.

(10) Patent No.: US 12,129,150 B2
(45) Date of Patent: Oct. 29, 2024

(54) COLLABORATIVE SCHEDULING METHOD FOR HIGH-RISE ELEVATORS BASED ON INTERNET OF THINGS

(71) Applicants: Changshu Institute of Technology, Suzhou (CN); Dongnan Elevator Co., Ltd., Suzhou (CN)

(72) Inventors: Fusheng Zhang, Suzhou (CN); Yang Ge, Suzhou (CN); Anbo Jiang, Suzhou (CN); Lingyun Ma, Suzhou (CN); Zhen Zhao, Suzhou (CN); Jianxin Ding, Suzhou (CN); Jiancong Qin, Suzhou (CN); Yong Ren, Suzhou (CN); Guodong Sun, Suzhou (CN); Yong Feng, Suzhou (CN); Linzhong Tang, Suzhou (CN)

(73) Assignees: Changshu Institute of Technology (CN); Dongnan Elevator Co., Ltd. (CN)

( * ) Notice: Subject to any disclaimer, the term of this patent is extended or adjusted under 35 U.S.C. 154(b) by 0 days.

(21) Appl. No.: 18/372,168

(22) Filed: Sep. 25, 2023

(65) Prior Publication Data

US 2024/0217772 A1 Jul. 4, 2024

(30) Foreign Application Priority Data

Jan. 3, 2023 (CN) .......................... 202310000515.0

(51) Int. Cl.
*B66B 1/24* (2006.01)
*B66B 1/28* (2006.01)
*B66B 1/34* (2006.01)

(52) U.S. Cl.
CPC .............. *B66B 1/28* (2013.01); *B66B 1/2408* (2013.01); *B66B 1/3476* (2013.01); *B66B 2201/222* (2013.01); *B66B 2201/403* (2013.01)

(58) Field of Classification Search
CPC .......... B66B 1/2408–2491; B66B 1/28; B66B 1/3407–3423; B66B 1/3446–3461; B66B 1/3476–3492; B66B 5/00–0018; B66B 2201/222; B66B 2201/235
See application file for complete search history.

(56) References Cited

U.S. PATENT DOCUMENTS

| 7,014,015 B2 * | 3/2006 | Nikovski ............... B66B 1/2458 187/382 |
| 11,697,571 B2 * | 7/2023 | Wang .................... B66B 5/0012 187/387 |

FOREIGN PATENT DOCUMENTS

| CN | 112001585 A | 11/2020 |
| CN | 113479727 A | 10/2021 |
| JP | 2003276963 A | 10/2003 |

* cited by examiner

*Primary Examiner* — Christopher Uhlir

(57) ABSTRACT

A collaborative scheduling method for high-rise elevators based on Internet of Things is provided. The method includes: obtaining the number of people carried at the current moment of each elevator in the elevator group, the target distance corresponding to the current moment of each elevator, and the number of people waiting at the current moment of each floor; predicting the number of people waiting for the going up and the number of people waiting for the going down at the current moment of each floor based on the monitoring video data of the elevator door every day in the preset historical days, and constructing the corresponding feature vectors of each elevator at the current moment and the corresponding feature vectors of the skyscraper at the current moment, and then obtaining the corresponding state vectors at the current moment, controlling each elevator based on state vector and a reinforcement learning network.

7 Claims, 2 Drawing Sheets

COLLABORATIVE SCHEDULING METHOD FOR HIGH-RISE ELEVATORS BASED ON INTERNET OF THINGS

CROSS REFERENCE TO THE RELATED APPLICATIONS

This application is based upon and claims priority to Chinese Patent Application No. 202310000515.0, filed on Jan. 3, 2023, the entire contents of which are incorporated herein by reference.

TECHNICAL FIELD

The invention relates to the field of elevator control technology and specifically relates to a collaborative scheduling method for high-rise elevators based on Internet of Things.

BACKGROUND

Modern skyscrapers often have hundreds of floors, and the flow of people mainly depends on vertical elevators. High-rise buildings become higher and higher, passenger flow is increasing, and the number of elevators is also increasing. A building has one or more elevator groups, and each elevator group is composed of multiple elevators. Therefore, coordinating the scheduling of multiple elevators, designing and optimizing the elevator service as a whole, shortening the passenger's waiting time and elevator ride time, reducing the elevator start times and stop times as much as possible, improving the efficiency of elevator operation and the comfort of passengers are necessary. At present, it has entered the stage of intelligent development of elevators. Most of the practical applications are first-come-first-serve algorithms, scanning algorithms, and LOOK algorithms for PLC (programmable logic controller) programming based on specific needs. However, the above elevator dispatching system based on PLC programming performs poorly in multi-ladder and peak passenger flow periods, the root cause of this problem is that the environmental information elevator dispatching system obtained is not sufficient. For example, the number of passengers on a certain floor can not be obtained, and the system cannot predict state changes and it is completely passive control. Considering the strong randomness of the users of vertical elevators and the need for instant response, the exchange of information between multiple elevators is a difficult problem. The built buildings generally cannot increase the number of elevators. Therefore, how to construct accurate communication between elevators and improve the efficiency of elevators is an important issue.

SUMMARY

In order to solve the above technical problems, the purpose of the invention is to provide a collaborative scheduling method for high-rise elevators based on Internet of Things, the technical solution adopted is as follows:
The invention provides a collaborative scheduling method for high-rise elevators based on Internet of Things, the method includes the following steps:
obtaining a number of people carried by each elevator in an elevator group at a current moment, obtaining a target distance corresponding to the current moment of each elevator based on a current position of each elevator in the elevator group, and a number of floors calling for the elevator;
obtaining an image of the current moment of an elevator door on each floor, and obtaining a waiting number on each floor at the current moment based on an image of the current moment of the elevator door and an OpenPose model; obtaining a number of people entering each elevator in each period of a preset historical day based on monitoring video data of the elevator door in the preset historical days, obtaining a proportion of people who take the elevator down in each period based on the number of people entering each elevator in each period and a running state of each elevator, predicting a number of people who take the elevator up and a number of people who take the elevator down at the current moment on each floor based on a proportion of people who take the elevator up and a number of people waiting at the current moment on each floor, the running state includes going up, going down and waiting;
constructing a feature vector corresponding to the current moment of each elevator based on a running state of each elevator in the elevator group at the current moment, a position of the current moment, the target distance and a number of people carried by the elevator; constructing a feature vector corresponding to the current moment of a skyscraper based on the number of people who take the elevator up and the number of people who take the elevator down at the current moment on each floor, obtaining a state vector corresponding to the current moment based on a feature vector corresponding to the current moment of each elevator and the feature vector corresponding to the current moment of the skyscraper; controlling each elevator based on the state vector and a trained reinforcement learning network, obtaining a reward function of the reinforcement learning network according to the number of people carried by each elevator, a passenger contribution of each elevator, the number of people waiting on each floor, and a comprehensive passenger mobility.

Preferably, the reward function of the reinforcement learning network is as follows:
constructing a first reward function based on comprehensive passenger mobility, the number of people waiting on each floor, and the number of people carried by each elevator:

$$R_j = \frac{\mu * TranPeo_j}{Time} - \sum_{i=1}^{M} \frac{1}{PeoNum_{i,j} * AllFlow_j + \lambda}$$

where $R_j$ is the first reward function, $TranPeo_j$ is a sum of the number of people carried by all elevators at the j th moment, $PeoNum_{i,j}$ is a number of people waiting on the i th floor at the j th moment, $AllFlow_j$ is comprehensive passenger mobility at the j th moment, $\mu$ is the first adjustment coefficient, $\lambda$ is an adjustment parameter, M is a total number of floors that the elevator can reach, and Time is a time consumed before the elevator is turned;
obtaining a slice reward function corresponding to each elevator according to the prediction accuracy corresponding to each moment, the passenger contribution of each elevator at each moment, and the first reward function, namely:

$$\text{Slice}_k(R_j) = (Acc_j + Val_i) * R_j$$

where $\text{Slice}_k(R_j)$ is a slice reward corresponding to the k th elevator, $Val_j$ is a passenger contribution of the elevator at the j th moment, and $Acc_j$ is a prediction accuracy corresponding to the j th moment.

Preferably, obtaining the proportion of people who take the elevator up corresponding to each period based on the number of people entering each elevator in each period and the running state of each elevator, including:

according to the number of passengers who take the elevator up and the number of passengers who take the elevator down in each period of each day in the preset historical days, constructing a data sequence of people who take the elevator up in a chronological order; based on the data sequence of people who take the elevator up, obtaining a synchronous data subsequence of people who take the elevator up corresponding to the same period of each day in the preset historical days;

for any period: according to the synchronous data subsequence of people who take the elevator up corresponding to the period and the total number of people waiting at the elevator door in the preset historical days, calculating the proportion of the number of people who take the elevator up corresponding to this period.

Preferably, obtaining the target distance corresponding to the current moment of each elevator based on the position of each elevator in the elevator group at the current moment and the number of floors calling the elevator, including:

for any elevator in the elevator group: calculating an absolute value of a difference between the number of floors of nearest stationary floors of the elevator and the number of floors calling the elevator at the current moment, and recording the absolute value as the target distance corresponding to the current moment of the elevator.

Preferably, using the following formula to calculate the proportion of people who take the elevator up corresponding to the target period:

$$UpRatio = \frac{1}{T} * \sum_{t=1}^{T} \frac{UpNum_t}{WaitNum_t}$$

where UpRatio is a proportion of the number of people who take the elevator up corresponding to the target period, $UpNum_t$ is a total number of people who take the elevator up in the target period in the t th day in historical days, $WaitNum_t$ is a total number of people waiting at the elevator door in the target period in the t th day in historical days, and T is a preset historical day;

the target period is the same period in historical days as the current period.

Preferably, predicting the number of people who take the elevator up and the number of people who take the elevator down at the current moment on each floor based on the proportion of people who take the elevator up and the number of people waiting at the current moment on each floor, including:

recording the same period in historical days as the current period as the target period;

for any floor: calculating a product of the proportion of the number of people who take the elevator up corresponding to the target period and the number of people waiting at the current moment of the floor as the number of people who take the elevator up at the current moment of the floor, using the difference between the number of people waiting at the current moment of the floor and the number of people who take the elevator up at the current moment of the floor as the number of people who take the elevator down at the current moment of the floor.

Preferably, an acquisition process of the passenger contribution of each elevator is as follows:

for any elevator: calculating a ratio of the number of people carried at the j th moment of the elevator to the sum of the number of people carried at the j th moment of all elevators, the ratio is treated as the passenger contribution of the elevator at the j th moment.

Preferably, an acquisition process of comprehensive passenger mobility is as follows:

for any floor: according to a set of passenger numbers at the previous time and a set of passenger numbers at the current moment of the floor, using the following formula to calculate the passenger mobility corresponding to the current moment of the floor:

$$\text{Flow}_t = |\text{Length}(E_{t-1}) - \text{Length}(E_{t-1} \cap E_t)|$$

where $\text{Flow}_t$ is passenger mobility corresponding to the current moment of the floor, $|\cdot|$ is taken as an absolute value, Length( ) is a length of the set, $E_{t-1}$ is the set of passenger numbers of the previous moment of the floor, $E_t$ is the set of passenger numbers of the current moment of the floor;

calculating a sum of passenger mobility corresponding to all floors at the current moment as the comprehensive passenger mobility at the current moment.

The invention has at least the following beneficial effects:

The invention first obtains the number of people carried by each elevator in the elevator group at the current moment, the target distance corresponding to the current moment of each elevator, and the number of people waiting at the current moment on each floor. Considering that the number of people taking the elevator in different periods of the day and the passengers' intentions to take the elevator are quite different, the invention obtains the monitoring video data of the elevator door every day in the preset historical days and analyzes the number of people who take the elevator up and the number of people who take the elevator down in each period in historical days, and the invention also predicts the number of people who take the elevator up and the number of people who take the elevator down in each floor at the current moment in real-time based on the proportion of the number of people who take the elevator up in each period, and constructs the corresponding feature vectors of each elevator and the corresponding feature vectors of the skyscraper, then the state vectors are obtained, and the control of the elevator in the elevator group is realized based on the state vectors and the trained reinforcement learning network. The invention combines the devices of Internet of Things to obtain the information of the passengers waiting at the elevator door and input the information into the reinforcement learning network, multiple agents in the reinforcement learning network cooperate to present the optimal strategy, which realizes the communication between the elevators in the elevator group, reduces the elevator waiting time, and improves the passenger loading efficiency.

BRIEF DESCRIPTION OF THE DRAWINGS

In order to explain the technical solution and advantages of the embodiment or existing technology of the invention more clearly, the drawings needed to be used in the embodiment or existing technology description are briefly introduced in the following. Obviously, the drawings in the following description are only one of the embodiments of the invention. For ordinary technicians in this field, they can also obtain other drawings based on these drawings without paying creative labor.

DETAILED DESCRIPTION OF THE EMBODIMENTS

In order to further elaborate the technical means and effects adopted by the invention to achieve the intended invention purpose, the following combined with the attached drawings and a better embodiment, a collaborative scheduling method for high-rise elevators based on Internet of Things proposed by the invention is described in detail as follows.

Unless otherwise defined, all technical and scientific terms used herein have the same meaning as those commonly understood by technicians in the technical field of the present invention.

The following is a specific scheme of a collaborative scheduling method for high-rise elevators based on Internet of Things provided by the invention in combination with the attached diagrams.

Figure 1:
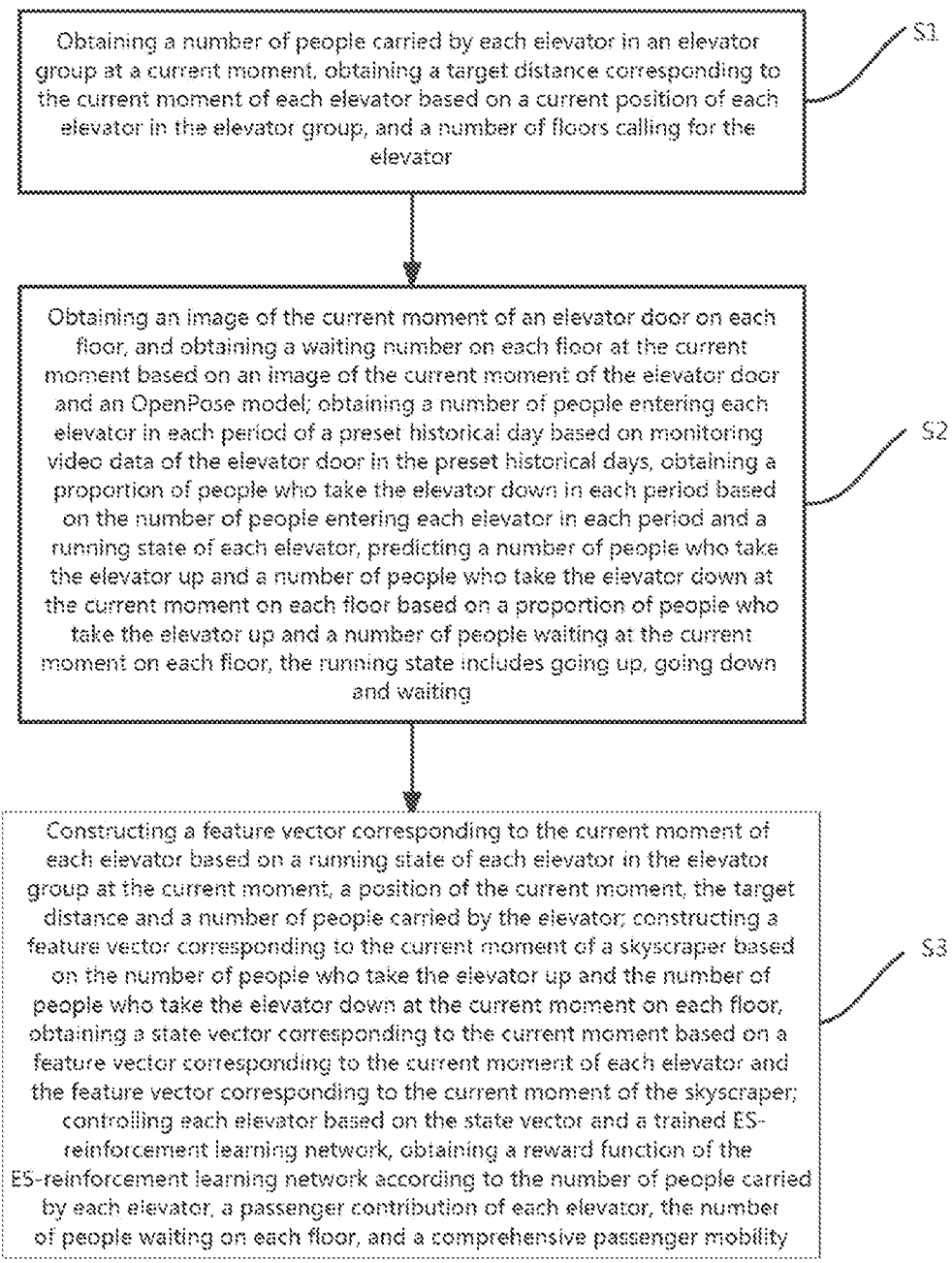
FIG. 1 is a flow chart of a collaborative scheduling method for high-rise elevators based on Internet of Things provided by the invention.

An embodiment of a collaborative scheduling method for high-rise elevators based on Internet of Things:

This embodiment proposes a collaborative scheduling method for high-rise elevators based on the Internet of Things. As shown in FIG. 1, a collaborative scheduling method for high-rise elevators based on the Internet of Things in this embodiment includes the following steps:

Step S1, obtaining a number of people carried by each elevator in an elevator group at the current moment, obtaining a target distance corresponding to the current moment of each elevator based on a current position of each elevator in the elevator group and a number of floors calling for the elevator;

There are often dozens of elevators in skyscrapers, which constitute several elevator groups, this embodiment is illustrated by any elevator group in the skyscraper. There are K elevators in the elevator group, if there are several passengers who want to go to a certain floor in the skyscraper, one of them needs to press the button in the target direction (the desired direction) outside the elevator group, then the elevator dispatching system receives the signal and arranges an elevator in the elevator group to meet the following three conditions to send the request to the floor: Condition 1, it is in the same direction with the request or in a waiting state; Condition 2, it is in the shortest distance; Condition 3, it can load as many passengers as possible; among them, condition 1 is the precondition, which is the rule widely used in most elevators at present, but this rule does have the optimal operation efficiency, it is the overall optimal scheme that takes into account the operation efficiency and user experience: the elevator runs in one direction each time and carries the passengers in the same direction. The elevator likely changes directions frequently in the process of operation, and the passengers need to estimate the arrival time of the elevator, so the running direction can only be changed after reaching the highest level of the user request. Condition 2 is to ensure that the efficiency of the elevator is as high as possible, the purpose of scheduling is to make the no-load elevator stop in the best position and take the least path when it is called next time. Condition 3 is to keep the elevator from doing meaningless stops if the elevator shows that it is full or the remaining capacity is small, the elevator can not be stopped for the floor that calling the elevator, it is a waste of time if the elevator still stops, so it is necessary to select the elevator with less priority passenger capacity in an elevator group. The collaborative scheduling of high-rise elevators is to achieve the fastest arrival in condition 2 and the avoidance of congestion in condition 3.

This embodiment takes any elevator group in the skyscraper as an example, a pressure sensor installed inside the elevator is used to collect the load-bearing weight in the elevator in real time and obtain the real-time load-bearing weight of each elevator in the elevator group. For any elevator in the elevator group, the ratio LoadNum of the load-bearing weight of the elevator at the current moment to the average weight $W_{one}$ of the adult is taken as the number of people carried in the elevator at the current moment. In the specific application, $W_{one}$=60 kg is set by this embodiment, the implementer can set it by himself in specific applications. It is also okay that LoadNum is estimated inaccurately here, because even if the items in the elevator are wrongly estimated as people, the items in the elevator will occupy space, and the role of LoadNum is to judge the occupied space in the elevator.

In order to achieve the fastest arrival of the elevator, it is necessary to analyze the running status of each elevator and find the elevator closest to the floor where the request is sent, considering that the elevator cannot stop in time, for example, when the elevator is about to pass through a non-stop floor, someone suddenly sends a request on this floor, and the elevator cannot stop in time. The control unit of the elevator records the nearest stationary floor of each elevator in real-time, for any elevator in the elevator group, the absolute value Δ of the difference between the number of floors of the nearest stationary floor of the elevator and the number of floors calling the elevator at the current moment is calculated, which is recorded as the target distance corresponding to the current moment of the elevator. The target distance corresponding to each elevator in the elevator group at the current moment can be obtained by using the above method.

Step S2, obtaining an image of the current moment of the elevator door on each floor, and obtaining a waiting number on each floor at the current moment based on the image of the current moment of the elevator door and an OpenPose model; obtaining a number of people entering each elevator in each period of preset historical days based on monitoring video data of the elevator door in the preset historical days, obtaining a proportion of people who take the elevator down in each period based on the number of people entering each elevator in each period and a running state of each elevator, predicting a number of people who take the elevator up and a number of people who take the elevator down at the current moment on each floor based on the proportion of people who take the elevator up and the number of people waiting at the current moment on each floor, the running state includes going up, going down and waiting.

The elevator dispatching system is connected to the monitoring network through the Internet of Things technology, the camera is used to obtain the images of the elevator doors on each floor at the current moment, the images of all floors are analyzed in real-time, and the number of people waiting for the elevator at the elevator door is detected. Specifically, this embodiment uses the OpenPose model to detect the key points of the head, shoulders, and feet of the human body in the image of the elevator door on each floor at the current moment and obtains the number of people waiting for the elevator at each floor at the current moment. The method that uses the OpenPose model to detect key points is an existing technology, which is no longer described here.

Then, this embodiment needs to predict the number of people who take the elevator up and people who take the elevator down at the current moment based on the number of people waiting for the elevator at the elevator door on each floor at the current moment, the number of people who take the elevator up and the number of people who take the elevator down in the historical process, and then the elevator scheduling is realized based on the prediction results. Therefore, the historical data is obtained first, and the historical data is the corresponding data of each day in the preset historical days. In this embodiment, the preset historical days are 100 days, and the last 100 days are traced back from 0 o'clock on the same day, and the numbers of passengers during the opening period of the elevator every day in the 100 days are obtained, that is, the number of people entering the elevator; the specific acquisition process is as follows: Firstly, defining the opening period, the elevator controller obtains the elevator opening time and the closing time after, and takes the period between the opening time and the closing time closest to the opening time after the opening time as an opening period; the Kalman filter algorithm is used to track the target, and the number of people entering the elevator during the opening of the door is obtained. This embodiment will use the OpenPose model to obtain the number of people entering the elevator during the opening of the door. The training data set of the OpenPose model is taken as the surveillance video data of the skyscraper, data annotation experts mark the actual orientation of each passenger and uses the training data set to train the OpenPose model. Finally, the trained OpenPose model is obtained; the training process of OpenPose model is an existing technology, which will not be described here. The embodiment takes 10 minutes as a period, so each day corresponds to multiple periods, and the monitoring video data of the elevator door in each period in 100 historical days are input into the trained OpenPose model to obtain the number of people entering the elevator in each period; in general, the passenger's willingness to take the direction of the elevator is consistent with the entry. If a passenger suddenly enters the elevator when the elevator is going up, it indicates that the passenger's intention to take the elevator up; if a passenger suddenly enters the elevator when the elevator is going down, it indicates that the passenger's intention to take the elevator down; based on above judgments, the number of passengers who take the elevator up and the number of passengers who take the elevator down in each period of each day in 100 historical days are counted, considering that it is possible that the door opening period spans two periods, the door opening period is attributed to the previous period, and the total number of passengers who take the elevator up and the total number of passengers who take the elevator down in each period of each day in 100 historical days are obtained.

Considering that the probability of passengers who take the elevator up on the ground floor and the floors below is higher, and the probability of passengers who take the elevator down of other floors is higher, the number of passengers who take the elevator up and the number of passengers who take the elevator down in the same period of different dates are related, because most people will take the elevator up at the same period of each day. This embodiment will predict the number of passengers who take the elevator up and the number of passengers who take the elevator down at the current moment based on the number of passengers who take the elevator up and the number of passengers who take the elevator down in each period of each day in 100 historical days. According to the number of passengers who take the elevator up in each period of each day in 100 historical days, the total data sequence of people who take the elevator up is constructed in chronological order, that is, $Z_S=\{s_{1,1}, s_{1,2}, \ldots, s_{1,u}, s_{2,1}, s_{2,2}, \ldots, s_{2,u}, \ldots, s_{100,1}, s_{100,2}, \ldots, s_{100,u}\}$, where $Z_S$ is a total data sequence of people who take the elevator up, u is a total number of periods in each day, $s_{1,1}$ is a total number of passengers who take the elevator up in the first period of the first historical day, $s_{1,2}$ is a total number of passengers who take the elevator up in the second period of the first historical day, $s_{1,u}$ is a total number of passengers who take the elevator up in the u-th period of the first historical day, $s_{2,1}$ is a total number of passengers who take the elevator up in the first period of the second historical day, $s_{2,2}$ is a total number of passengers who take the elevator up in the second period of the second historical day, $s_{2,u}$ is a total number of people who take the elevator up of the u-th period in the second historical day, $s_{100,1}$ is a total number of people who take the elevator up of the first period the 100 th historical day, $s_{100,2}$ is a total number of people who take the elevator up of the second period the 100 th historical day, and $s_{100,u}$ is a total number of people who take the elevator up of the u-th period the 100 th historical day. Then, the synchronous data subsequence of people who take the elevator up corresponding to the same period of each day in 100 historical days is obtained based on the data sequence of people who take the elevator up. For the first period, the corresponding synchronous data subsequence of people who take the elevator up is $S1=\{s_{1,1}, s_{2,1}, \ldots, s_{100,1}\}$; at this point, the synchronous data subsequence of people who take the elevator up corresponding to each period is obtained.

The same periods as the current period in historical days of each day are recorded as the target periods. Assuming that the current moment is 12:06, which is in the period from 12:00 to 12:10, then the period from 12:00 to 12:10 on each day is the target period. According to the number of elevator doors on each floor in the target periods of each day in 100 historical days, the total number of elevator doors in the target period of each day in 100 historical days is calculated. According to the synchronous data subsequence of people who take the elevator up corresponding to the target period and the total number of people waiting at the elevator door in the target period of 100 historical days, the proportion of people who take the elevator up corresponding to the target period is calculated, namely:

$$UpRatio = \frac{1}{T} * \sum_{t=1}^{T} \frac{UpNum_t}{WaitNum_t}$$

where UpRatio is a proportion of the number of people who take the elevator up corresponding to the target period, $UpNum_t$ is a total number of people who take the elevator up in the target period in the t th historical day, $WaitNum_t$ is a total number of people waiting at the elevator door in the target period in the t th historical day, and T is a preset historical days, T in this embodiment is set to 100, the implementer can set it by himself in specific applications.

According to the proportion of the number of people who take the elevator up corresponding to the target period and the number of people waiting at the current moment on each floor, the number of people who take the elevator up and the number of people who take the elevator down at the current moment on each floor are predicted, that is, for any floor: calculating a product of the proportion of the number of people who take the elevator up corresponding to the target period and the number of people waiting at the current moment of the floor as the number of people who take the elevator up at the current moment of the floor, using the difference between the number of people waiting at the current moment of the floor and the number of people who take the elevator up at the current moment of the floor as the number of people who take the elevator down at the current moment of the floor.

For the target periods: the mean square errors of the total number of people who take the elevator up in the target period of each day in 100 historical days are calculated, that is, the mean square errors of all elements in the synchronous data subsequence of people who take the elevator up corresponding to the target period are calculated; at the same time, the average values of the total number of people waiting at the elevator door during the target period of each day in 100 historical days are calculated. Then, based on the mean square error and the mean value, the prediction accuracy corresponding to the target period is calculated, that is:

$$Acc = 1 - \frac{\nabla UpNum}{\overline{WN} + 0.01}$$

where Acc is a prediction accuracy corresponding to the target period, $\overline{WN}$ is an average value of the total number of people waiting at the elevator door during the target period of each day in 100 historical days, and $\nabla UpNum$ is a mean square error of all elements in the synchronous data subsequence of people who take the elevator up corresponding to the target period.

The prediction accuracy corresponding to each period can be obtained by using the above method, and the prediction accuracy needs to be considered when realizing an elevator collaborative scheduling of the elevator group in the subsequent steps.

Step S3, constructing a feature vector corresponding to the current moment of each elevator based on the running state of each elevator in the elevator group at the current moment, the position of the current moment, the target distance and the number of people carried; constructing a feature vector corresponding to the current moment of a skyscraper based on the number of people who take the elevator up and the number of people who take the elevator down at the current moment on each floor, obtaining a state vector corresponding to the current moment based on the feature vector corresponding to the current moment of each elevator and the feature vector corresponding to the current moment of the skyscraper; controlling each elevator based on the state vector and a trained reinforcement learning network, obtaining a reward function of the reinforcement learning network according to the number of people carried by each elevator, a passenger contribution of each elevator, the number of people waiting on each floor, and a comprehensive passenger mobility.

According to the current running state of each elevator in the elevator group, the current position of each elevator in the elevator group, the corresponding target distance of each elevator in the elevator group, and the number of people carried in each elevator in the elevator group, the corresponding feature vector of each elevator in the elevator group at the current moment is constructed. For the k th elevator, the corresponding feature vector at the current moment is $X_k$=(Direction, DePos, $\Delta$, LoadNum), where the value Direction is distributed in $\{-1,0,1\}$, which represents a running state of the elevator, −1 represents going down, 0 represents waiting (i.e. waiting state), and 1 represents going up, DePos represents a current position of the elevator; at this point, the feature vector corresponding to the current moment of each elevator in the elevator group is obtained. According to the number of people who take the elevator up and the number of people who take the elevator down at the current moment on each floor, the corresponding feature vector of the skyscraper at the current moment is constructed as Y=($Flr_1$Up, $Flr_1$Down, $Flr_2$Up, $Flr_2$Down, . . . , $Flr_M$Up, $Flr_M$Down) where M is the highest floor that the elevator group can reach, $Flr_1$Up is a number of people who take the elevator up at the current moment of the first floor, $Flr_1$Down is a number of people who take the elevator down at the current moment of the first floor, $Flr_2$UP is a number of people who take the elevator up at the current moment of the second floor, $Flr_2$Down is a number of people who take the elevator down at the current moment of the second floor, $Flr_M$Up is a number of people who take the elevator up at the current moment of the M th floor, and $Flr_M$Down is a number of people who take the elevator down at the current moment of the M th floor. It should be noted that this embodiment takes each floor from the first floor to the M th floor of the skyscraper as an example to construct the corresponding feature vector of the skyscraper, the skyscraper corresponding feature vector is constructed according to the specific floor that the elevator can reach in the specific application.

This embodiment is based on the feature vector corresponding to the current moment of each elevator in the elevator group and the feature vector corresponding to the current moment of the skyscraper to construct the state vector corresponding to the current moment, that is, $P_t$=($X_1$, $X_2$, . . . , $X_K$, Y), where $P_t$ is a state vector corresponding to the current moment, $X_1$ is a feature vector corresponding to the first elevator at the current moment, $X_2$ is a feature vector corresponding to the second elevator at the current moment, $X_K$ is a feature vector corresponding to the k th elevator at the current moment, and K is a total number of elevators in the elevator group.

Figure 2:
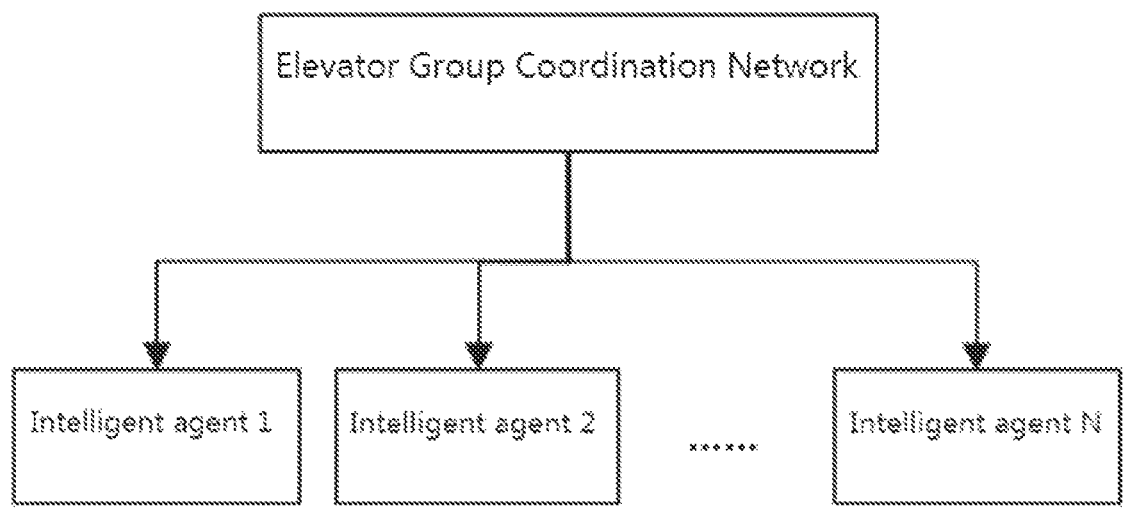
FIG. 2 is a schematic diagram of a coordination network of an elevator group.

This embodiment will use an reinforcement learning network to realize the control of elevators in the elevator group. Intelligent agents in reinforcement learning expect to obtain the maximum reward value given by the environment by performing corresponding actions in the practical environment, so as to correct their action strategies continuously in the specific environment by a continuous trial and error learning based on rewards. The reinforcement learning network has two layers. The first layer is the elevator group coordination network, and the second layer has N intelligent agents. Each agent contains a policy network, as shown in FIG. 2. The whole network is updated asynchronously: assuming that the current moment is time t, the intelligent agents of the elevator obtain the old information of the previous time (i.e., time t−1), including the old information of other intelligent agents, and then directly executes the strategy. The elevator group coordinates the network to collect information as the input of the intelligent agents at the next time (i.e., time t+1) to achieve the effect of cooperation, and the intelligent agents can respond to the passenger's request more quickly. The interaction between multiple agents and the coordination network is as follows: At the initial moment of each hour, the intelligent agent obtains the state of the current period by observing the environment as the state of the current moment, but it is not directly input into the deep Q network of the intelligent agent, and the state is uniformly obtained by the elevator group coordination network. Then the elevator group coordination network sends the control vector to each intelligent agent according to all the information obtained. the intelligent agent splices the control vector into a state vector and inputs the state vector into its deep Q network to obtain the action 4, that should be performed, and finally, a new state is triggered and the reward given by the environment is obtained. The reward refers to the feedback value given by the environment through the action from the current state to the next state, the reward is used to evaluate the value of the state-action combination at the next moment.

The action vector $A_t$ refers to whether the elevator goes to the requested floor and which floors the elevator is requested to go to; each elevator corresponds to an action vector, for any elevator, its corresponding action vector is $A_t$=(Dt, ArrFlr1,ArrFlr2, . . . , ArrFlrM), Dt represents the direction of progress after the change, ArrFlr1 represents whether the elevator stops on the first floor, ArrFlr2 represents whether the elevator stops on the second floor, and ArrFlrM represents whether the elevator stops on the M th floor. The value of each element of ArrFlr1, ArrFlr2, . . . , ArrFlrM is 0 or 1, 0 means non-stop, and 1 means stop. It should be noted that although the composition of the state vector $P_t$ and the action vector $A_t$ is similar, the state vector only means that the request has been received and does not necessarily need to be satisfied, the action vector $A_t$ is the floor that will be satisfied. the intelligent agents of each elevator are made to balance the efficiency between 'using the remaining capacity to meet the number of transports brought by the request of a certain floor' and 'the time consumed by going to the request floor'. For example, a going up elevator picks up passengers on the first floor, and the remaining space can only take two people, while passengers on the second floor more than two people, then, after receiving the request from the second floor, it is not necessary to stop at the second floor. It can be handed over to another elevator with a larger remaining capacity to meet the request of the second floor, or it can be handed over by the same elevator when it goes up the next time, so as to accelerate the elevator to transport passengers and achieve a global optimization so that the elevator can carry more people and deliver passengers to the destination faster. The specific control effect can be reflected in the composition of the reward function of the training reinforcement learning network. When the elevator obtains the waiting number information of the floor, it can arrange multiple elevators to meet the passengers who also take the elevator up, the flow is divided so that the expected number of floors requested by multiple elevators will be reduced and the running speed will be increased. Therefore, the cooperation of multiple intelligent agents can improve operational efficiency, it is necessary to train reinforcement learning network to achieve the above control effect.

The reward value can indicate the optimization direction of the whole reinforcement learning network, and the specific optimization algorithm is the time difference algorithm, the reward function is used to guide the learning direction of the intelligent agents, and finally, the eligible reinforcement learning network is fitted.

Specifically, the estimated operation process of the reward function is segmented first. The time consumed Time each time when the elevator goes up to a reversal of direction or when the elevator goes down to a reversal of direction is the time consumed this time when the elevator goes up to a reversal of direction or when the elevator goes down to a reversal of direction, the average time required for passengers to leave the elevator is obtained as $T_{IO}$, the element with the highest value of floors of 1 is selected in the action vector $A_t$=(Dt, ArrFlr1, ArrFlr2, . . . , ArrFlrM), and the floor is marked as a destination, then the internal parameters of the elevator controller are used to obtain the time $T_{tran}$ required for the elevator to reach the destination, and the time consumed before each reversal of direction is calculated, that is:

$$\text{Time} = T_{tran} + PeoNum \times T_{IO}$$

where PeoNum is a total number of passengers who get off the elevator before the direction of the elevator is adjusted.

Each time the intelligent agents output an action $A_t$, a prediction of the going up and going down reward function is completed. Although it is impossible to know how many passengers get off the elevator on a certain floor, the number of times the elevator opens the door can be determined, so the time of opening the door can be determined; at the same time, the number of passengers getting off the elevator can also be certain, so the time of passengers who get off the elevator is certain.

Considering that the passenger mobility on some floors in the skyscraper is low, and the passenger mobility on some floors is high, in order to schedule the elevator more accurately, it is necessary to obtain the passenger mobility on each floor. Specifically, for any floor, the OpenPose model assigns a number to each passenger waiting on the floor to form a set of passenger numbers. According to the set $E_{t-1}$ of passenger numbers at the last moment (i.e. time t−1) of the floor and the set $E_t$ of passenger numbers at the current moment (i.e. time t) of the floor, the remaining number of passengers at the last moment at the current moment is measured and it is taken as the passenger mobility corresponding to the current moment of the floor, that is:

$$\text{Flow}_t = |\text{Length}(E_{t-1}) - \text{Length}(E_{t-1} \cap E_t)|$$

where $\text{Flow}_t$ is passenger mobility corresponds to the current moment on the floor, |·| is taken as an absolute value, Length( ) is a length of the set.

The passenger mobility corresponding to each floor at the current moment can be obtained by using the above method, and the passenger mobility $\text{Flow}_t$ of the M th floors can be summed to obtain the comprehensive passenger mobility $\text{AllFlow}_t$ at the current moment. It should be noted that the training data set of the reinforcement learning network is the historical operation data of the elevator, so it is necessary to obtain comprehensive passenger mobility at a historical moment. The comprehensive passenger mobility at the historical moment is the same as the acquisition method for comprehensive passenger mobility at the current moment. Since the comprehensive passenger mobility at the current moment has been described in the above process, the specific acquisition process of comprehensive passenger mobility at each historical moment no longer be described in detail in this embodiment.

Based on the comprehensive passenger mobility, the number of people waiting (waiting for the elevator) on each floor, and the number of people carried by each elevator, the first reward function is constructed. The first reward function is the overall reward function, and the first reward function is specifically as follows:

$$R_j = \frac{\mu * TranPeo_j}{Time} - \sum_{i=1}^{M} \frac{1}{PeoNum_{i,j} * AllFlow_j + \lambda}$$

where $R_j$ is the first reward function, $TranPeo_j$ is a sum of the number of people carried by all elevators at the j th moment, $PeoNum_{i,j}$ is the number of people waiting on the i th floor at the j th moment, $AllFlow_j$ is a comprehensive passenger mobility at the j th moment, $\mu$ is the first adjustment coefficient, $\lambda$ is an adjustment parameter. The value of $\mu$ can be determined by known techniques, such as reverse reinforcement learning, which uses expert demonstrations to learn the reward function, and then it uses the first reward function to train reinforcement learning strategies or uses deep reinforcement learning algorithms to automatically learn the appropriate value of rewards through neural network methods. The adjustment parameter is introduced to prevent the denominator from being 0, and the value of $\lambda$ in this embodiment is 0.01, the implementer can set it by himself in specific applications.

For the k th elevator: calculating the ratio of the number of people carried at the j th moment of the elevator to the sum of the number of people carried at the j th moment of all elevators, the ratio is taken as the passenger contribution of the elevator at the j th moment; the passenger contribution of the elevator at each moment can be obtained by using the above method. Then, according to the prediction accuracy Acc, the passenger contribution of the elevator at the j th moment and the first reward function, the slice reward function is constructed, that is, the slice reward corresponding to the elevator is as follows:

$$Slice_k(R_j) = (Acc_j + Val_j) * R_j$$

where $Slice_k(R_j)$ is a slice reward corresponding to the k th elevator, $Val_j$ is a passenger contribution of the elevator at the j th moment, and $Acc_j$ is a prediction accuracy corresponding to the j th moment.

Each intelligent agent gets its own reward according to its contribution, which is used as a reference to update the parameters in the Q network. Each intelligent agent gets its own reward according to its contribution and then takes the reward value as the parameter of the time difference algorithm so that the Q network makes a gradient descent in the direction of the greater reward value so that the parameters in the Q network are updated in the direction of the target.

The training data set of the reinforcement learning network is obtained, and the training data set is the data in the historical operation process of the elevator. The elevator scheduling simulation demonstration software is used to generate data, and the passenger flow simulation is set one hour before a peak period and two hours during the peak period, the training is repeated about 1 million times (the time in the simulation demonstration software can be accelerated, so the training time depends on the performance of the training device) until the growth of the reward function is not significant, that is, the reinforcement learning network training is completed. Where a threshold can be set for the determination of insignificant growth. If the growth is less than the threshold, the growth of the reward function is determined to be insignificant, that is, the reinforcement learning network training is completed. The model of this embodiment does not need to consider the reward function when it is used, and only the policy network and the coordination network in each intelligent agent are required to run in order to achieve the response to various situations. The elevator control system is only used to run the trained model, and the training task that requires high computational power of the reinforcement learning neural network is not undertaken by the system. Therefore, the amount of memory occupied in the test process reflects the real configuration requirements of the elevator control platform. The algorithm in this embodiment takes up less memory than the original algorithm in the test process, so it can run in the general elevator group scheduling system. The specific parameters can be converted into the physical signal of the elevator controller by using known technology. The processing realizes the most efficient scheduling, the expected arrival time and the expected waiting time for the elevator to go down inside and outside the elevator can also be displayed, it is beneficial for the passenger to plan their time.

The corresponding state vector at the current moment is input into the trained reinforcement learning network to realize the elevator scheduling. In the specific application, the corresponding state vector is input into the trained reinforcement learning network in real-time to schedule each elevator in the elevator group, so as to realize the communication between elevators and improve the passenger carrying efficiency.

First, the embodiment obtains the number of people carried by each elevator in the elevator group at the current moment, the target distance corresponding to the current moment of each elevator, and the number of people waiting for each floor at the current moment. Considering that the number of people taking the elevator in different periods of the day and the passenger's intention to take the elevator are quite different, this embodiment obtains the monitoring video data of elevator doors every day in the preset historical days, and analyzes the number of people who take the elevator up and the number of people who take the elevator down in each period in historical days. Based on the proportion of the number of people who take the elevator up in each period, the number of people who take the elevator up and the number of people who take the elevator down on each floor at the current moment are predicted in real-time. The feature vector corresponding to each elevator and the feature vector corresponding to the skyscraper is constructed, and then the state vector is obtained. Based on the state vector and the trained reinforcement learning network, the control of the elevator in the elevator group is realized. This embodiment combines the Internet of Things equipment to obtain the information of the passengers waiting at the elevator door and inputs the information into the reinforcement learning network. In the reinforcement learning network, multiple intelligent agents work together to present the optimal strategy, which realizes the communication between the elevators in the elevator group, reduces the time spent when the elevator stopped, and improves the passenger carrying efficiency.

It should be noted that the above content is only a better embodiment of the invention and is not used to limit the invention. Any modifications, equivalent replacements, improvements, etc., within the principles of the invention, should be included in the protection scope of the invention.

What is claimed is:

1. A collaborative scheduling method for a high-rise elevator based on Internet of Things, comprising the following steps:
   obtaining a number of people carried by each elevator in an elevator group at a current moment;
   obtaining a target distance corresponding to the current moment of each elevator based on a current position of each elevator in the elevator group, and a number of floors with an elevator request;
   obtaining an image of the current moment of an elevator door on each floor;
   obtaining a waiting number on each floor at the current moment based on the image of the current moment of the elevator door and an OpenPose model;
   obtaining a number of people entering each elevator in each period of a preset historical day based on monitoring video data of the elevator door in preset historical days, and obtaining a proportion of people who took an elevator up in each period based on the number of people entering each elevator in each period and a running state of each elevator, and predicting a number of people who take the elevator up and a number of people who take the elevator down at the current moment on each floor based on a proportion of people who take the elevator up and a number of people waiting at a current moment on each floor, the running state comprises going up, going down or waiting;
   constructing a feature vector corresponding to the current moment of each elevator based on a running state of each elevator in the elevator group at the current moment, a position of the current moment, the target distance and a number of people carried by the elevator;
   constructing a feature vector corresponding to the current moment of a skyscraper based on the number of people who take the elevator up and the number of people who take the elevator down at the current moment on each floor, obtaining a state vector corresponding to the current moment based on the feature vector corresponding to the current moment of each elevator and the feature vector corresponding to the current moment of the skyscraper;
   controlling each elevator based on the state vector and a trained learning network comprising a reinforcement learning network; and
   obtaining a reward function of the reinforcement learning network according to the number of people carried by each elevator, a passenger contribution of each elevator, the number of people waiting on each floor, and a comprehensive passenger mobility, wherein the comprehensive passenger mobility is a sum of passenger movements on each floor at the current moment, wherein the reward function of the reinforcement learning network is as follows:

constructing a first reward function based on the comprehensive passenger mobility, the number of people waiting on each floor, and the number of people carried by each elevator:

$$R_j = \frac{\mu * TranPeo_j}{Time} - \sum_{i=1}^{M} \frac{1}{PeoNum_{i,j} * AllFlow_j + \lambda}$$

wherein $R_j$ is the first reward function, $TranPeo_j$ is a sum of the number of people carried by all elevators at a j th moment, $PeoNume_{i,j}$ is a number of people waiting on an i th floor at the j th moment, $AllFlow_j$ is a comprehensive passenger mobility at the j th moment, $\mu$ is a first adjustment coefficient, $\lambda$ is an adjustment parameter, M is a total number of floors that the elevator can reach, and Time is a time consumed before the elevator is turned; and
   obtaining a slice reward function corresponding to each elevator according to a prediction accuracy corresponding to each moment, the passenger contribution of each elevator at each moment, and the first reward function wherein:

$$Slice_k(R_j) = (Acc_j + Val_i) * R_j$$

wherein $Slice_k(R_j)$ is a slice reward corresponding to a k th elevator, $Val_j$ is a passenger contribution of the k th elevator at the j th moment, and $Acc_j$ is a prediction accuracy corresponding to the j th moment.

2. The collaborative scheduling method for the high-rise elevators based on Internet of Things according to claim 1, wherein the operation of obtaining the proportion of people who take the elevator up corresponding to each period based on the number of people entering each elevator in each period and the running state of each elevator comprises:
   according to the number of passengers who took the elevator up and the number of passengers who took the elevator down in each period of each day in preset historical days;
   constructing a data sequence of people who took the elevator up in a chronological order;
   based on the data sequence of people who take the elevator up, obtaining a synchronous data subsequence of people who took the elevator up corresponding to a same period of each day in the preset historical days;
   for any period: according to the synchronous data subsequence of people who took the elevator up corresponding to same period and a total number of people waiting at the elevator door in the preset historical days; and
   calculating the proportion of people who took the elevator up corresponding to the same period.

3. The collaborative scheduling method for the high-rise elevators based on Internet of Things according to claim 1, wherein the operation of obtaining the target distance corresponding to the current moment of each elevator based on the position of each elevator in the elevator group at the current moment and the number of floors with an elevator request comprises:
   for any elevator in the elevator group: calculating an absolute value of a difference between number of floors of nearest stationary floors of the elevator and the number of floors with an elevator request at the current moment, and recording the absolute value as the target distance corresponding to the current moment of the elevator.

4. The collaborative scheduling method for the high-rise elevators based on Internet of Things according to claim 2, wherein using the following formula to calculate the proportion of people who take the elevator up corresponding to a target period is:

$$UpRatio = \frac{1}{T} * \sum_{t=1}^{T} \frac{UpNum_t}{WaitNum_t}$$

wherein UpRatio is a proportion of the number of people who take the elevator up corresponding to the target period, $UpNum_t$ is a total number of people who took the elevator up in the target period in a t th day in historical days, $WaitNum_t$ is a total number of people waiting at the elevator door in the target period in the t th day in historical days, and T is a preset historical days; and the target period is the same period in historical days as a current period.

5. The collaborative scheduling method for the high-rise elevators based on Internet of Things according to claim 4, wherein the operation of predicting the number of people who take the elevator up and the number of people who take the elevator down at the current moment on each floor based on the proportion of people who take the elevator up and the number of people waiting at the current moment on each floor comprises:

recording the same period in historical days as the current period and as the target period; and for any floor: calculating a product of the proportion of the number of people who take the elevator up corresponding to the target period and the number of people waiting at the current moment of the floor as the number of people who take the elevator up at the current moment of the floor, using a difference between the number of people waiting at the current moment of the floor and the number of people who take the elevator up at the current moment of the floor as the number of people who take the elevator down at the current moment of the floor.

6. The collaborative scheduling method for the high-rise elevators based on Internet of Things according to claim 1, wherein an acquisition process of the passenger contribution of each elevator is as follows:

for any elevator: calculating a ratio of the number of people carried at the j th moment of the elevator to the sum of the number of people carried at the j th moment of all elevators, the ratio is treated as the passenger contribution of the elevator at the j th moment.

7. The collaborative scheduling method for the high-rise elevators based on Internet of Things according to claim 1, wherein an acquisition process of the comprehensive passenger mobility is as follows:

for any floor: according to a set of passenger numbers at a previous time and a set of passenger numbers at the current moment of the floor, using the following formula to calculate the comprehensive passenger mobility corresponding to the current moment of the floor:

$$Flow_t = |Length(E_{t-1}) - Length(E_{t-1} \cap E_t)|$$

wherein $Flow_t$ is the comprehensive passenger mobility corresponding to the current moment of the floor, |·| is taken as an absolute value, Length( ) is a length of the set, $E_{t-1}$ is a set of passenger numbers of the previous time of the floor, $E_t$ is a set of passenger numbers of the current moment of the floor; and calculating a sum of passenger mobility corresponding to all floors at the current moment as the comprehensive passenger mobility at the current moment.

* * * * *